Oct. 28, 1930.   J. W. TATTER   1,779,994
TRACTOR WHEEL
Filed Sept. 3, 1926   2 Sheets-Sheet 1
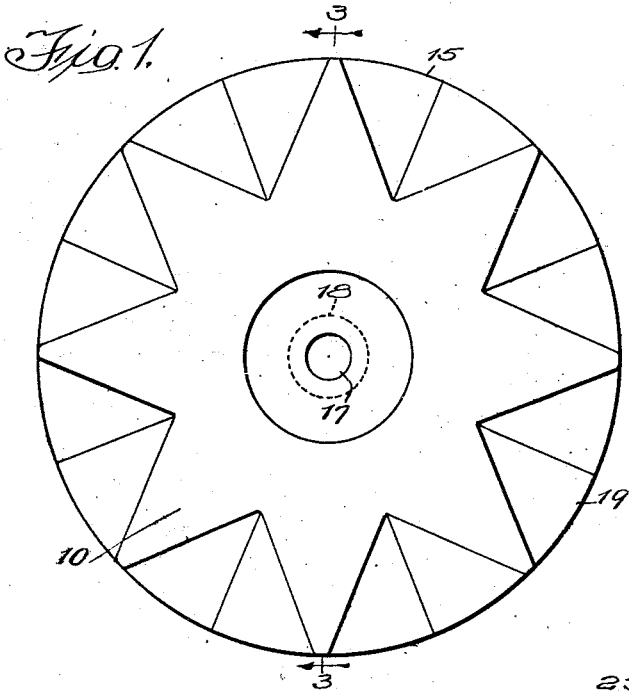
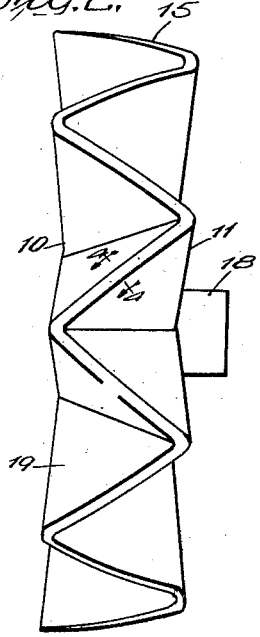
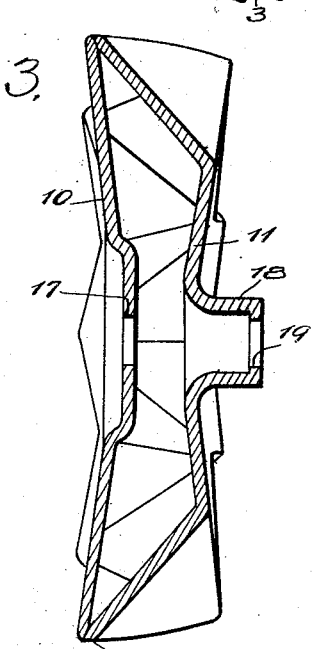
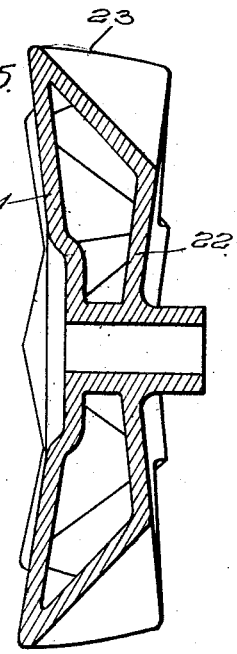
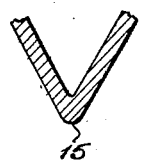
Witnesses:
William L. Kilroy
Harry R. LaWhite
Inventor
John W. Tatter
By Hill & Hill
Attys.

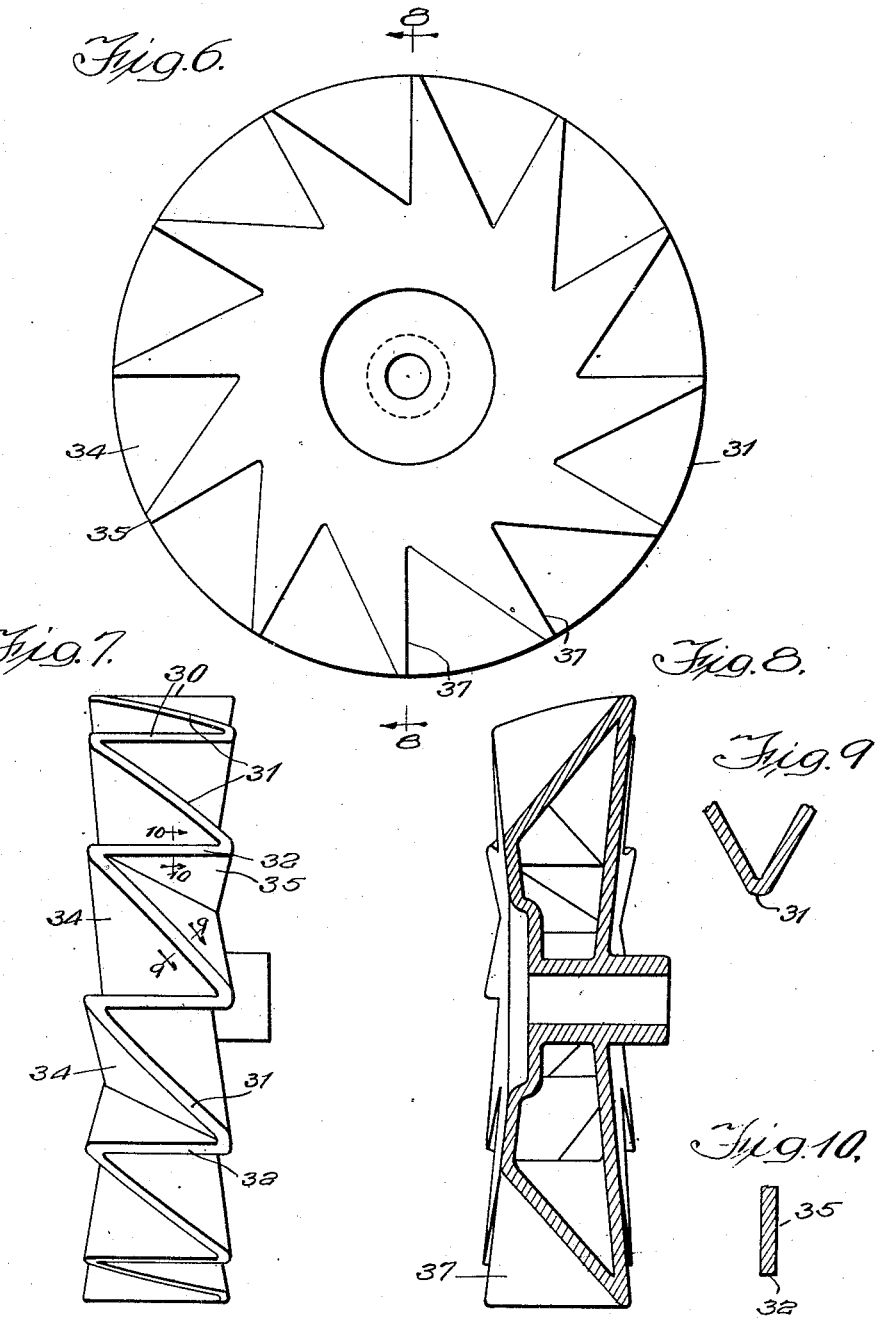

Patented Oct. 28, 1930

1,779,994

UNITED STATES PATENT OFFICE

JOHN W. TATTER, OF CHICAGO, ILLINOIS

TRACTOR WHEEL

Application filed September 3, 1926. Serial No. 133,428.

My invention relates to tractor wheels and has among its other objects the production of devices of the kind described which are convenient, durable and satisfactory for use wherever found applicable.

A particular object of the invention is to provide an improved tractor wheel which is substantially self-cleaning.

Another particular object of the invention is to provide a tractor wheel which may be used upon a paved road without injury thereto and which is provided with an improved ground-engaging part.

One form of the invention is embodied in a spokeless wheel having a ground-engaging edge which folds or zig-zags back and forth from one side of the wheel to the other thereof, the folds of the edge forming the apices of wedges which insure that mud will not adhere to the wheel and also prevent the wheel from sinking into soft earth an undesirable distance. The folds are disposed at substantially the same angles to planes coincident with the axis of rotation of the wheel.

Another form of the invention is embodied in a wheel having a ground-engaging edge which zig-zags back and forth from one side of the wheel to the other, alternate folds being the apices of ground-engaging wedges. In this instance, the other alternate folds lie in planes substantially coincident with the axis of rotation of the wheel, the wheel being formed with ground-engaging surfaces disposed in these planes to obtain a maximum tractive effort.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a side elevation of a tractor wheel embodying the invention;

Fig. 2 is an end elevation of the improved wheel;

Fig. 3 is a section taken on line 3—3 of Fig. 1;

Fig. 4 is a fragmentary section taken on line 4—4 of Fig. 2;

Fig. 5 is a transverse central section taken through a tractor wheel embodying another form of the invention;

Fig. 6 is a side elevation of a tractor wheel embodying still another form of the invention;

Fig. 7 is an end elevation of the improved wheel shown in Fig. 6;

Fig. 8 is a section taken on line 8—8 of Fig. 6;

Fig. 9 is a fragmentary section taken on line 9—9 of Fig. 7; and

Fig. 10 is a fragmentary section taken on line 10—10 of Fig. 7.

Referring for the present to Figs. 1 to 4, inclusive, wherein I have shown a tractor wheel embodying a preferred form of the invention, it will be noted that the wheel is formed from two side plates 10 and 11, which are preferably manufactured from pressed steel or the equivalent and are welded to each other, as indicated at 12, at the periphery of the wheel. It will also be noted that the side plates 10 and 11 are so formed that they provide a ground-engaging edge 15 which folds or zig-zags back and forth from one side of the wheel to the other, the ground-engaging edge 15 being preferably of sufficient width so that it may support a load upon a paved road without injury to the pavement. In this instance, the several folds in the edge 15 are disposed at equal angles to planes coincident with the axis of rotation of the wheel, and as best shown in Fig. 4, each fold forms the apex of a wedge which extends from the outer edge of the wheel to a point intermediate the edge and the axis of rotation. These wedges are formed in the side plates 10 and 11 and as best shown in Figs. 1 and 3, the side plates 10 and 11 are preferably imperforate between the outer edges thereof and hub portions thereof hereinafter described. The outer surfaces of the side plates 10 and 11 are preferably concave or dished, this construction being particularly advantageous in the side plate 10 as it negatives the necessity of having the end of the axle projecting beyond the wheel. The side plate 10 is preferably provided with an axle-receiving aperture 17 and the side plate 11 is preferably formed with an integral hub 18 having an axle-receiving aperture 19 aligned with the aperture 17.

The improved wheel shown in Figs. 1 to 4, inclusive, is substantially self-cleaning in that when the wheel is in use earth is continuously packed into the V-shaped depressions or notches 19 formed by the aforementioned wedges and this earth is continuously forced out and continuously scours the surfaces of the wedges or the notches 19. I am aware that wheels have been formed from single plates which have had zig-zag folds provided therein and I am also aware that tractor wheels having zig-zag bars or the equivalent formed in the tread have also been employed. My improved construction differs from these devices in that each wheel is formed from a plurality of side plates so that the wheel will be of sufficient width to prevent it from sinking any considerable distance into soft earth. It is obvious that the wheel may be made of any desired width to conform to its weight and to the use to which it is to be put. Another advantage of my improved construction is that the side plates 10 and 11 obviate the necessity of providing spokes, which usually become clogged with mud when the wheel of which they form a part is in use.

In Fig. 5 I have shown another form of the invention embodied in a wheel which is preferably formed in a single casting or molding operation, the wheel being preferably formed with integral side plates 21 and 22 which correspond to the aforementioned side plates 10 and 11. The side plates 21 and 22 form a zig-zag edge 23 substantially identical to the aforementioned zig-zag edge 15 and the folds of the zig-zag edge 23 form the apices of wedges which are substantially identical to the aforementioned wedges shown in Figs. 1 to 4, inclusive. The wheel shown in Fig. 5 is substantially identical to the wheel shown in Figs. 1 to 4, inclusive, with the exception that it is manufactured in a casting operation and is not formed from pressed steel or the equivalent.

Referring now to Figs. 6 to 10, inclusive, wherein I have shown a tractor wheel embodying another form of the invention, it will be noted that the wheel is provided with a ground-engaging edge 30, which folds or zig-zags back and forth from one side of the wheel to the other. The alternate folds indicated by the reference character 31 form angles with planes passing through the axis of rotation of the wheel and the alternate folds 32 disposed intermediate the folds 31 are disposed in planes passing through the axis of rotation of the wheel. Each of the outer edges of the folds 31 forms the apex of a wedge 34, as best illustrated in Figs. 7 and 9 and each of the folds 32 of the edge 30 forms the outer edge of a blade 35, as best illustrated in Figs. 7 and 10. The folds 32 provide driving surfaces 37 lying in planes passing through the axis of rotation of the wheel, the driving faces 37 being so disposed with respect to adjacent wedges 34 that earth packing into the wheel will scour the faces 37. The wheel shown in Figs. 6 to 10, inclusive, is formed from a single casting, but it is obvious from the foregoing description of the wheel shown in Figs. 1 to 4, inclusive, that the wheel shown in Figs. 6 to 10, inclusive, could be made from a pair of pressed steel plates.

While my improved tractor wheel is preferably formed with imperforate side plates, in some instances I may prefer to replace relatively small sections of the side plates with spokes, a single disc, or the equivalent. This, of course, depends upon the use to which the tractor is to be put.

It is readily understood that the wedges serve as cleats and that they serve simultaneously as driving and supporting surfaces. When a wheel embodying the invention sinks into the ground, both the driving and supporting surfaces increase in area in proportion to the softness of the ground and the effective diameter of the wheel decreases in proportion to the softness of the ground. This is equivalent to changing the gear ratio between the engine and the wheel and insures a maximum tractive effort.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A tractor wheel having a passage therethrough for an axle and having side plates extending substantially from said passage to the periphery of the wheel, said side plates being formed to provide driving surfaces disposed in planes parallel to and intersecting in the axis of rotation of the wheel.

2. A tractor wheel having a passage therethrough for an axle and having side plates extending substantially from said passage to the periphery of the wheel, said side plates being formed to provide driving surfaces disposed in planes parallel to and intersecting in the axis of rotation of the wheel and being formed to provide ground-engaging wedges between said driving surfaces.

3. A tractor wheel comprising a ground engaging rim having side edges disposed entirely in two parallel planes, the ground engaging surface of said wheel being formed to provide a plurality of wedges each having an apex extending entirely across the maximum width of the wheel and arranged to provide a zig-zag tread upon which the wheel travels over hard roads.

4. A hollow tractor wheel comprising spaced side walls, portions formed integral with said walls and providing a rim having side edges disposed entirely in two parallel planes, said rim being formed with a plurality of wedges each having an apex extending entirely across the maximum width of the wheel and forming a continuous zig-zag tread upon which the wheel travels over hard roads.

In testimony whereof, I have hereunto signed my name.

JOHN W. TATTER.